United States Patent
Minegishi et al.

(10) Patent No.: US 11,499,631 B2
(45) Date of Patent: Nov. 15, 2022

(54) MOTOR VEHICLE

(71) Applicant: TOYOTA JIDOSHA KABUSHIKI KAISHA, Toyota (JP)

(72) Inventors: Shinichiro Minegishi, Toyota (JP); Shigeru Chiba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 503 days.

(21) Appl. No.: 16/248,224

(22) Filed: Jan. 15, 2019

(65) Prior Publication Data

US 2019/0219161 A1 Jul. 18, 2019

(30) Foreign Application Priority Data

Jan. 15, 2018 (JP) .............................. JP2018-004303

(51) Int. Cl.
*F16H 61/12* (2010.01)
*F16H 59/60* (2006.01)
*F16H 59/10* (2006.01)
*F16H 59/66* (2006.01)

(52) U.S. Cl.
CPC ........... *F16H 61/12* (2013.01); *F16H 59/105* (2013.01); *F16H 59/60* (2013.01); *F16H 2059/666* (2013.01); *F16H 2061/1284* (2013.01)

(58) Field of Classification Search
CPC .... F16H 61/12; F16H 61/16; F16H 2061/207; F16H 2061/161; F16H 59/60; F16H 59/105
USPC ......................................................... 701/51
See application file for complete search history.

(56) References Cited

U.S. PATENT DOCUMENTS

| 10,107,390 | B2 * | 10/2018 | Zhao | B60L 15/2018 |
| 10,253,872 | B2 * | 4/2019 | Riera | F16H 61/0248 |
| 10,352,437 | B2 * | 7/2019 | Lee | B60W 40/072 |
| 10,670,141 | B1 * | 6/2020 | Conley | F16H 59/20 |

(Continued)

FOREIGN PATENT DOCUMENTS

| CN | 107097784 A | 8/2017 |
| CN | 107110348 A | 8/2017 |

(Continued)

OTHER PUBLICATIONS

Machine Translation Ogami (JP2001165309) (Year: 2001).*

*Primary Examiner* — Thomas Randazzo
*Assistant Examiner* — Michael E Butler
(74) *Attorney, Agent, or Firm* — Sughrue Mion, PLLC (57) ABSTRACT

The motor vehicle is configured to recognize a shift position in response to the user's shift operation of a shift lever and to control a driving system, based on the shift position and the user's accelerator operation, brake operation and steering operation. On occurrence of a predetermined abnormality that causes a failure in recognizing the shift position, the motor vehicle sets an abnormality-time shift position based on vehicle peripheral information and notifies the abnormality-time shift position. When a moving direction is set by a moving direction setting unit that is provided separately from the shift lever and that allows the user to set the moving direction, the motor vehicle resets the abnormality-time shift position based on the moving direction, and controls the driving system, based on the abnormality-time shift position, the brake operation and the steering operation.

20 Claims, 6 Drawing Sheets

(56) References Cited

U.S. PATENT DOCUMENTS

| | | | |
|---|---|---|---|
| 2009/0171544 A1 | 7/2009 | Tanaka et al. | |
| 2010/0312424 A1* | 12/2010 | Yasui | F16H 63/3466 |
| | | | 701/31.4 |
| 2014/0188356 A1 | 7/2014 | Hokoi | |
| 2014/0292078 A1* | 10/2014 | Northall | B60L 3/0023 |
| | | | 307/10.1 |
| 2015/0217766 A1* | 8/2015 | Kelly | B60W 10/184 |
| | | | 701/94 |
| 2015/0321551 A1* | 11/2015 | Hendry | F16H 61/12 |
| | | | 701/62 |
| 2016/0146340 A1* | 5/2016 | Toyokawa | F16H 61/12 |
| | | | 701/51 |
| 2018/0003296 A1 | 1/2018 | Hoshino et al. | |
| 2018/0106368 A1* | 4/2018 | Tasaka | B60W 50/045 |
| 2018/0209535 A1 | 7/2018 | Hase | |
| 2018/0297589 A1 | 10/2018 | Hasejima et al. | |
| 2020/0282999 A1* | 9/2020 | Mizrachi | G01C 21/3815 |

FOREIGN PATENT DOCUMENTS

| | | | |
|---|---|---|---|
| JP | 2001165309 * | 6/2001 | F16H 61/28 |
| JP | 2003-267080 A | 9/2003 | |
| JP | 2009-154738 A | 7/2009 | |
| JP | 2012-117377 A | 6/2012 | |
| JP | 2015-209895 A | 11/2015 | |
| JP | 2016-132302 A | 7/2016 | |
| JP | 2016-158451 A | 9/2016 | |
| JP | 2017-067255 A | 4/2017 | |
| JP | 2017-81398 A | 5/2017 | |
| WO | 2013005324 A1 | 1/2013 | |

* cited by examiner

Is it alright that the shift position is D (Drive)?

OK

Please set the moving direction when a change is required.

Reverse

Is it alright that the shift position is R (Reverse)?

OK

Please set the moving direction when a change is required.

Drive

FIG. 7

MOTOR VEHICLE

CROSS-REFERENCE TO RELATED APPLICATIONS

The present disclosure claims priority to Japanese Patent Application No. 2018-004303 filed Jan. 15, 2018, which is incorporated herein by reference in its entirety including specification, drawings and claims.

TECHNICAL FIELD

The present disclosure relates to a motor vehicle.

BACKGROUND

A proposed configuration of a motor vehicle causes an output signal from a shift sensor that detects the operating position of a shift lever to be input into a plurality of CPUs (as described in, for example, JP 2017-067255A). When an abnormality occurs in part of the CPUs, the motor vehicle of this configuration causes the remaining CPU to identify the shift position based on the output signal from the shift sensor and performs emergency drive based on the identified shift position.

SUMMARY

The motor vehicle described above can be driven when any CPU among the plurality of CPUs is enabled to recognize the output signal from the shift sensor. When all the CPUs fail to recognize the output signal from the shift sensor, however, the above motor vehicle cannot be driven.

A main object of the present disclosure is to enable a motor vehicle to be driven even when a shift position based on the user's shift operation is unrecognized.

In order to achieve the above primary object, the motor vehicle of the present disclosure employs the following configuration.

The present disclosure is directed to a motor vehicle. The motor vehicle includes a driving system configured to cause the motor vehicle to run and a control device configured to recognize a shift position in response to a user's shift operation of a shift lever and to control the driving system, based on the shift position and the user's accelerator operation, brake operation and steering operation. On occurrence of a predetermined abnormality that causes a failure in recognizing the shift position, the control device sets an abnormality-time shift position based on vehicle peripheral information and notifies the abnormality-time shift position, and when a moving direction is set by a moving direction setting unit that is provided separately from the shift lever and that allows the user to set the moving direction, the control device resets the abnormality-time shift position based on the moving direction, and controls the driving system, based on the abnormality-time shift position, the brake operation and the steering operation.

The motor vehicle according to this aspect of the present disclosure recognizes the shift position in response to the user's shift operation of the shift lever and controls the driving system, based on the shift position and the user's accelerator operation, brake operation and steering operation. On occurrence of the predetermined abnormality that causes a failure in recognizing the shift position, the motor vehicle sets the abnormality-time shift position based on the vehicle peripheral information and notifies the abnormality-time shift position. When the moving direction is set by the moving direction setting unit that is provided separately from the shift lever and that allows the user to set the moving direction, the motor vehicle resets the abnormality-time shift position based on the set moving direction, and controls the driving system, based on the abnormality-time shift position, the brake operation and the steering operation. Accordingly, when the predetermined abnormality occurs (i.e., when the shift position is unrecognized), the motor vehicle sets and notifies the abnormality-time shift position, based on the vehicle peripheral information. When the user determines that the abnormality-time shift position is inadequate and sets the moving direction, the abnormality-time shift position is reset, based on the set moving direction. Even when the predetermined abnormality occurs, this configuration enables the motor vehicle to be driven at the user's desired abnormality-time shift position.

"Notification of the abnormality-time shift position" is implemented by display of the abnormality-time shift position on an in-vehicle display or on a display of a mobile terminal or by audio output the abnormality-time shift position from an in-vehicle speaker or a speaker of a mobile terminal. The "moving direction setting unit" may be, for example, an in-vehicle touch panel display, an in-vehicle button, an in-vehicle voice recognition system or a touch panel display, a button or a voice recognition system of a mobile terminal. The mobile terminal may be, for example, a smartphone or a tablet that is communicable with the vehicle and that is taken into the vehicle interior.

DESCRIPTION OF EMBODIMENTS

The following describes some aspects of the disclosure with reference to embodiments.

Figure 1:
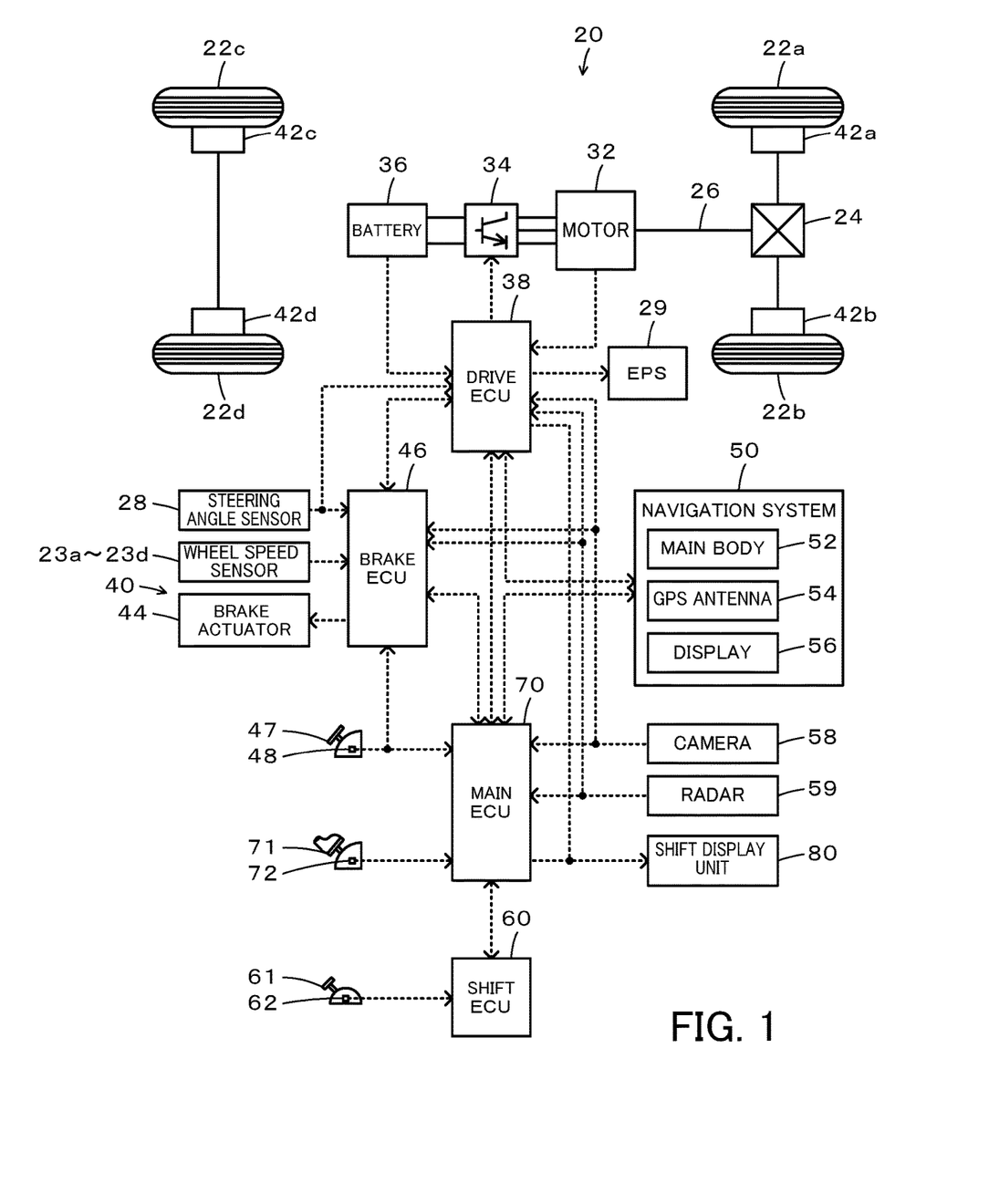
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 36 serving as a power storage device, a drive electronic control unit (hereinafter referred to as "drive ECU") 38, a hydraulic brake system 40, a brake electronic control unit (hereinafter referred to as "brake ECU") 46, a navigation system 50, a shift electronic control unit (hereinafter referred to as "shift ECU") 60, and a main electronic control unit (hereinafter referred to as "main ECU") 70.

The motor 32 is configured, for example, as a synchronous generator motor and includes a rotor connected with a driveshaft 26 that is coupled with drive wheels 22a and 22b via a differential gear 24. The drive ECU 38 performs switching control of a plurality of switching elements included in the inverter 34, so as to rotate and drive the motor 32. The battery 36 is configured by, for example, a lithium ion rechargeable battery or a nickel metal hydride battery and is connected with the inverter 34 via power lines.

The drive ECU 38 is configured as a CPU-based microprocessor and includes a ROM configured to store processing programs, a RAM configured to temporarily store data, input/output ports and a communication port, in addition to the CPU, although not being illustrated. For example, signals from various sensors configured to detect the conditions of the motor 32 (for example, the rotational position of the rotor and the phase currents of the respective phases), signals from various sensors configured to detect the conditions of the battery 36 (for example, the voltage, the electric current and the temperature), a steering angle θw from a steering angle sensor configured to detect the steering angle, and spatial information with regard to the periphery of the vehicle from a camera 58 and a radar 59 are input into the drive ECU 38 via the input port. For example, switching control signals to the plurality of switching elements included in the inverter 34, a control signal to an electric power steering (EPS) 29 configured to assist steering, and a control signal to a shift display unit 80 configured to display the shift position (when the main ECU 70 fails to control the shift display unit 80) are output from the drive ECU 38 via the output port. The drive ECU 38 is connected with the brake ECU 46, the navigation system 50 and the main ECU 70 via respective communication ports.

The hydraulic brake system 40 includes brake wheel cylinders 42a to 42d mounted to the drive wheels 22a and 22b and driven wheels 22c and 22d, and a brake actuator 44 configured to regulate hydraulic pressures of the brake wheel cylinders 42a to 42d and apply braking forces to the drive wheels 22a and 22b and to the driven wheels 22c and 22d. The brake actuator 44 is driven and controlled by the brake ECU 46.

The brake ECU 46 is configured as a CPU-based microprocessor and includes a ROM configured to store processing programs, a RAM configured to temporarily store data, input/output ports and a communication port, in addition to the CPU, although not being illustrated. For example, a brake depression amount BP from a brake pedal position sensor 48 configured to detect a depression amount of a brake pedal 47, wheel speeds Vwa to Vwd of the drive wheels 22a and 22b and the driven wheels 22c and 22d from wheel speed sensors 23a to 23d mounted to the drive wheels 22a and 22b and the driven wheels 22c and 22d, the steering angle θw from the steering angle sensor 28 configured to detect the steering angle and the spatial information with regard to the periphery of the vehicle from the camera 58 and the radar 59 are input into the brake ECU 46 via the input port. For example, drive control signals to the brake actuator 44 are output from the brake ECU 46 via the output port. The brake ECU 46 calculates a vehicle speed V, based on the wheel speeds Vwa to Vwd of the drive wheels 22a and 22b and the driven wheels 22c and 22d input from the wheel speed sensors 23a to 23d. The calculation of the vehicle speed V may set, for example, the third largest value among the wheel speeds Vwa to Vwd to the vehicle speed V or may set an average value of the wheel speeds Vwa to Vwd to the vehicle speed V. The brake ECU 46 is connected with the drive ECU 38 and the main ECU 70 via the respective communication ports.

The navigation system 50 includes a main body 52 having a CPU, a ROM, a RAM, input/output ports and a communication port as well as a recording medium such as a hard disk that stores map information and the like; a GPS antenna 54 configured to receive information with regard to the current location of the own vehicle; and a touch panel display 56 configured to display various information including map information, the current location of the own vehicle and a planned driving route to a destination and to enable the user to enter various instructions. The map information includes, for example, service information (for example, tourism information and parking places) and road information of predetermined respective driving intervals (for example, traffic light intervals and intersection intervals) that are stored in the form of a database. The road information include distance information, road width information, number-of-lanes information, district information (urban or suburban), type information (general roads, expressways, and toll roads), gradient information, legal speed limits and the number of traffic lights. The navigation system 50 is connected with the drive ECU 38 and the main ECU 70 via the respective communication ports.

When the user operates the display 56 to set a destination, the navigation system 50 sets a planned driving route from the current location of the vehicle to the destination, based on the map information, the current location of the own vehicle and the destination, displays the set planned driving route on the display 56, and starts route guide.

The shift ECU 60 is configured as a CPU-based microprocessor and includes a ROM configured to store processing programs, a RAM configured to temporarily store data, input/output ports and a communication port, in addition to the CPU, although not being illustrated. A shift position from a shift position sensor 62 configured to detect an operating position of a shift lever 61 is input into the shift ECU 60 via the input port. The shift ECU 60 sets one of, for example, a drive position (D position), a reverse position (R position), a parking position (P position) and a neutral position (N position) to a shift position SP, based on the set shift position. The shift ECU 60 is connected with the main ECU 70 via the respective communication ports.

The main ECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the main ECU 70 via the input port. The signals input into the main ECU 70 include, for example, the spatial information with regard to the periphery of the vehicle from the camera 58 and the radar 59, an accelerator position Acc from an accelerator pedal position sensor 72 configured to detect a depression amount of an accelerator pedal 71, and the brake depression amount BP from the brake pedal position sensor 48 configured to detect the depression amount of the brake pedal 47. For example, a control signal to the shift display unit 80 is output from the main ECU 70 via the output port. The main ECU 70 is connected with the drive ECU 38, the brake ECU 46, the navigation system 50 and the shift ECU 60 via the respective communication ports.

In the electric vehicle 20 of the embodiment having the above configuration, the main ECU 70 periodically sets a required torque Td* that is required for the vehicle, based on the shift position SP from the shift ECU 60, the accelerator position Acc from the accelerator pedal position sensor 72, the brake depression amount BP from the brake pedal position sensor 48, and the vehicle speed V from the brake ECU 46, and sets a torque command Tm* of the motor 32 and a braking torque command Tbk* of the hydraulic brake system 40, based on the set required torque Td*. The main ECU 70 subsequently sends the torque command Tm* of the motor 32 to the drive ECU 38 and sends the braking torque command Tbk* of the hydraulic brake system 40 to the brake ECU 46. When receiving the torque command Tm* of the motor 32, the drive ECU 38 performs switching control of the plurality of switching elements included in the inverter 34 such as to output a torque corresponding to the torque command Tm* from the motor 32 to the driveshaft 26. When receiving the braking torque command Tbk* of the hydraulic brake system 40, the brake ECU 46 controls the hydraulic brake system 40 to output a braking torque corresponding to the braking torque command Tbk* from the hydraulic brake system 40 to the drive wheels 22a and 22b and to the driven wheels 22c and 22d.

In the electric vehicle 20 of the embodiment, the drive ECU 38 controls the electric power steering 29 to assist the user's steering operation.

Figure 2:
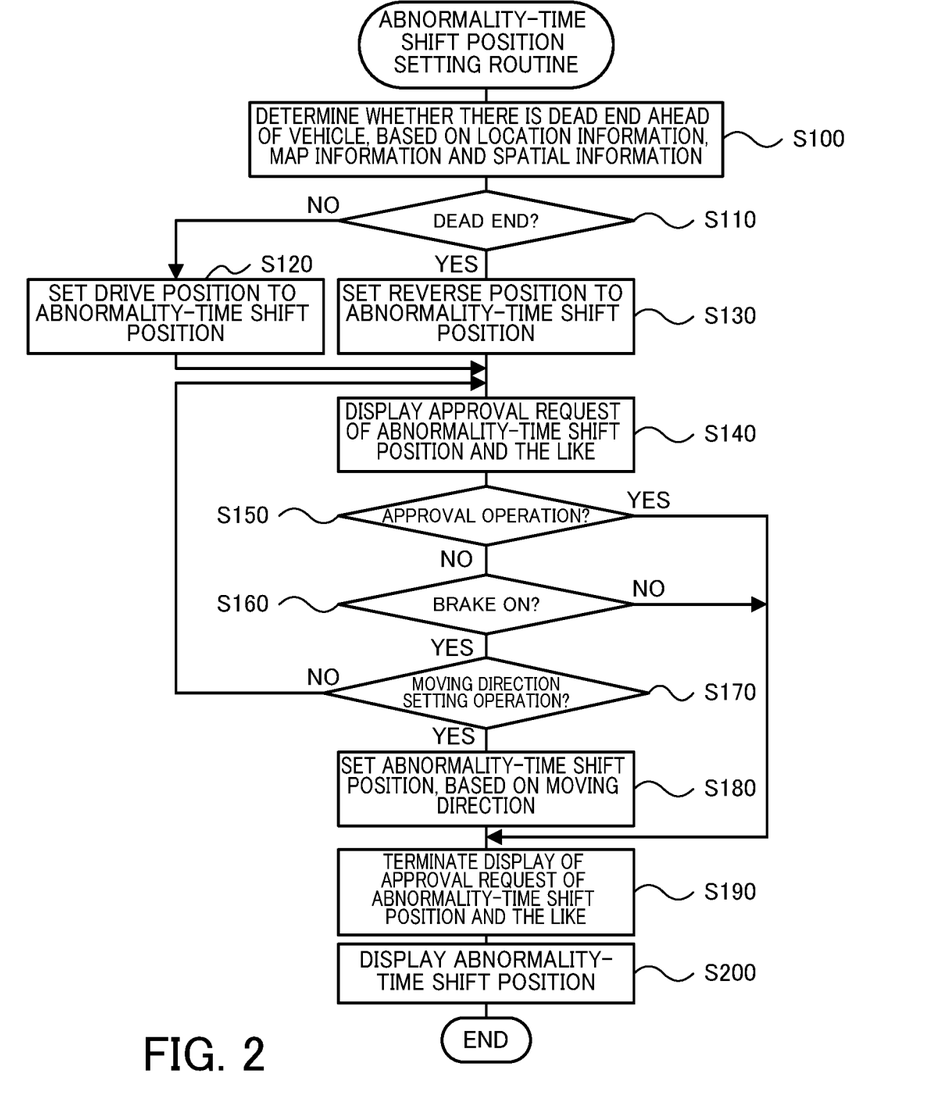
FIG. 2 is a flowchart showing one example of an abnormality-time shift position setting routine performed by a drive ECU.
Figure 3:
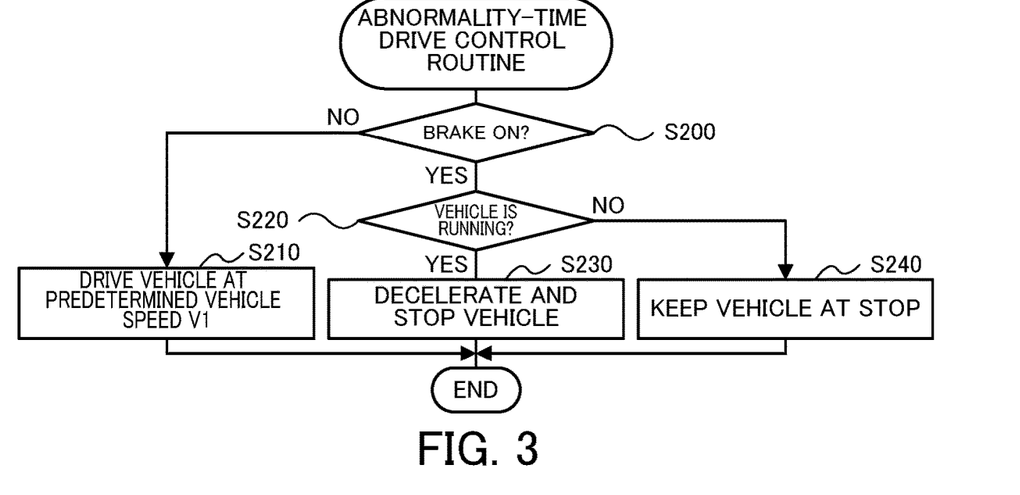
FIG. 3 is a flowchart showing one example of an abnormality-time drive control routine performed by the drive ECU.

The following describes the operations of the electric vehicle 20 of the embodiment and more specifically describes a series of operations when an abnormality occurs in the main ECU 70 (when all the ECUs fail to recognize the shift position SP and the accelerator position Acc). FIG. 2 is a flowchart showing one example of an abnormality-time shift position setting routine performed by the drive ECU 38. FIG. 3 is a flowchart showing one example of an abnormality-time drive control routine performed by the drive ECU 38. These routines are sequentially described below.

The following describes first the abnormality-time shift position setting routine of FIG. 2. This routine is performed by the drive ECU 38 when the vehicle stops (every time the vehicle stops) in the state that an abnormality occurs in the main ECU 70. When no abnormality occurs in the main ECU 70, the shift position SP is sent from the main ECU 70 to the drive ECU 38. When an abnormality occurs in the main ECU 70 during vehicle running, the drive ECU 38 sets an immediate previous shift position SP (i.e., the last shift position SP set by the shift ECU 60 and received via the main ECU 70) to an abnormality-time shift position SP2 and displays the abnormality-time shift position SP2 on the shift display unit 80. When the vehicle stops, the drive ECU 38 performs the abnormality-time shift position setting routine of FIG. 2.

When the abnormality-time shift position setting routine is triggered, the drive ECU 38 determines whether there is a dead end ahead of the vehicle, based on location information (information with regard to the current location of the own vehicle) and the map information (road information and the like) from the navigation system 50 and the spatial information with regard to the periphery of the vehicle from the camera 58 and the radar 59 (steps S100 and S110).

The determination of whether there is a dead end ahead of the vehicle may be, for example, with regard to a parking space in a parking place, based on determination of whether the vehicle is parked front (at stop) or parked back, and with regard to the place other than the parking space, based on determination of whether there is a space ahead of the vehicle for turning the vehicle. According to the embodiment, when the vehicle is parked front in a parking space or when there is no space ahead of the vehicle for turning the vehicle in the place other than the parking space, it is determined that there is a dead end ahead of the vehicle. When the vehicle is parked back in a parking space or when there is a space ahead of the vehicle for turning the vehicle in the place other than the parking space, on the other hand, it is determined that there is no dead end ahead of the vehicle.

Figure 4:
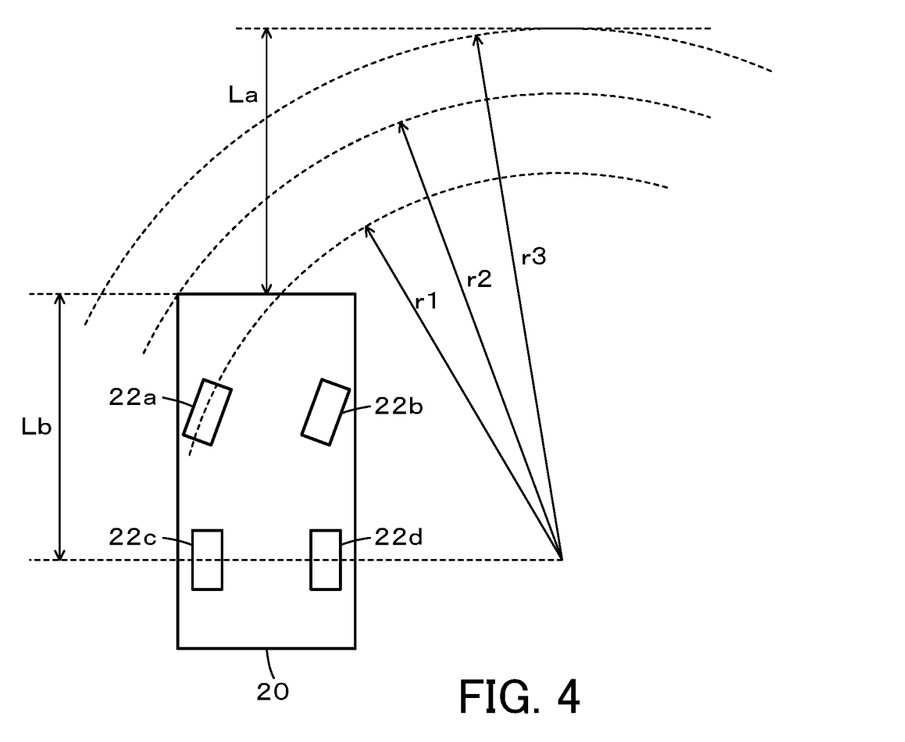
FIG. 4 is a diagram illustrating the predetermined distance La.
Figure 5A:
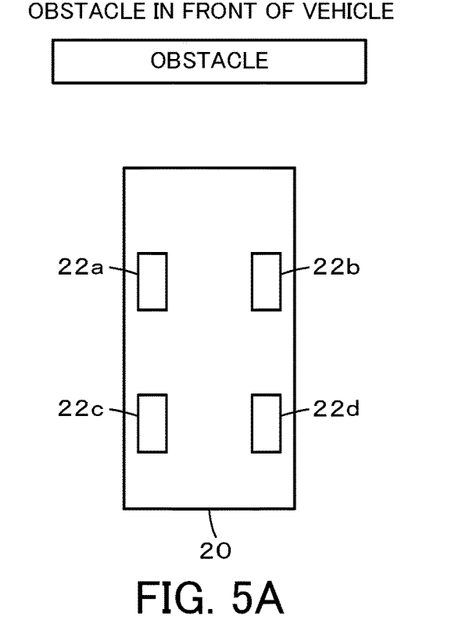
FIG. 5A is a diagram illustrating one example of the case where it is determined that there is no space ahead of the vehicle for turning the vehicle.
Figure 5B:
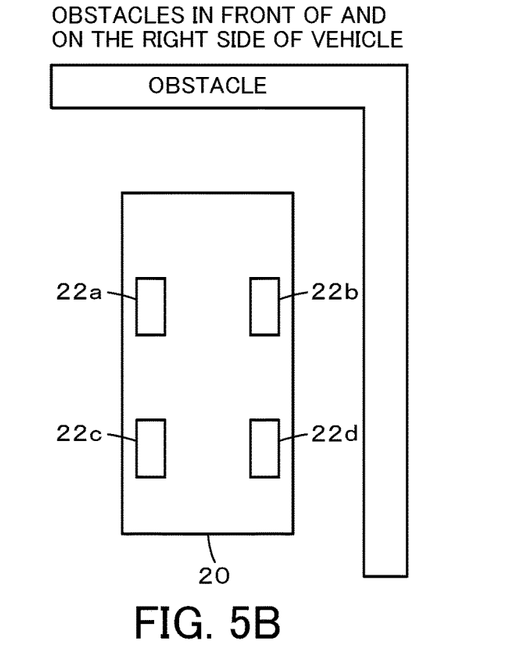
FIG. 5B is a diagram illustrating another example of the case where it is determined that there is no space ahead of the vehicle for turning the vehicle.
Figure 5C:
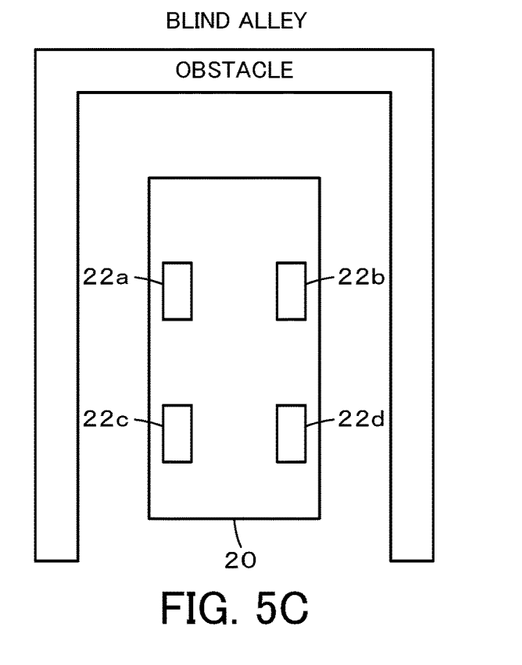
FIG. 5C is a diagram illustrating another example of the case where it is determined that there is no space ahead of the vehicle for turning the vehicle.

The determination of whether there is a space ahead of the vehicle for turning the vehicle may be, for example, based on whether there is no obstacle such as another vehicle or a wall within a predetermined distance La ahead of the vehicle. FIG. 4 is a diagram illustrating the predetermined distance La. In the illustration of FIG. 4, "r1" indicates an outside wheel turning circle radius (minimum turning radius), "r2" indicates an outside vehicle body turning circle radius (minimum turning radius), and "r3" indicates a turning radius by addition of a margin to the vehicle body turning circle radius. The predetermined distance La used may be, for example, a difference (r3−Lb) between the turning radius r3 and a distance Lb from a frontmost end of the vehicle to an axis passing through the center of the driven wheels 22c and 22d in a left-right direction of the vehicle. FIG. 5A, FIG. 5B and FIG. 5C are diagrams illustrating examples of the case where it is determined that there is no space ahead of the vehicle for turning the vehicle. It is determined that there is no space ahead of the vehicle for turning the vehicle, for example, in the case where there is an obstacle in front of the vehicle as shown in FIG. 5A, in the case where there are obstacles in front of and on the right side of the vehicle as shown in FIG. 5B, or in the case of a blind alley or more specifically in the case where there are obstacles in front of, on the right side of and on the left side of the vehicle as shown in FIG. 5C.

When it is determined at steps S100 and S110 that there is no dead end ahead of the vehicle, the drive ECU 38 sets the drive position (D position) to the abnormality-time shift position SP2 (step S120). When it is determined at steps S100 and S110 that there is a dead end ahead of the vehicle, on the other hand, the drive ECU 38 sets the reverse position (R position) to the abnormality-time shift position SP2 (step S130). Even in the case where an abnormality occurs in the main ECU 70, this process enables the abnormality-time shift position SP2 to be set based on whether there is a dead end ahead of the vehicle.

Figure 6:
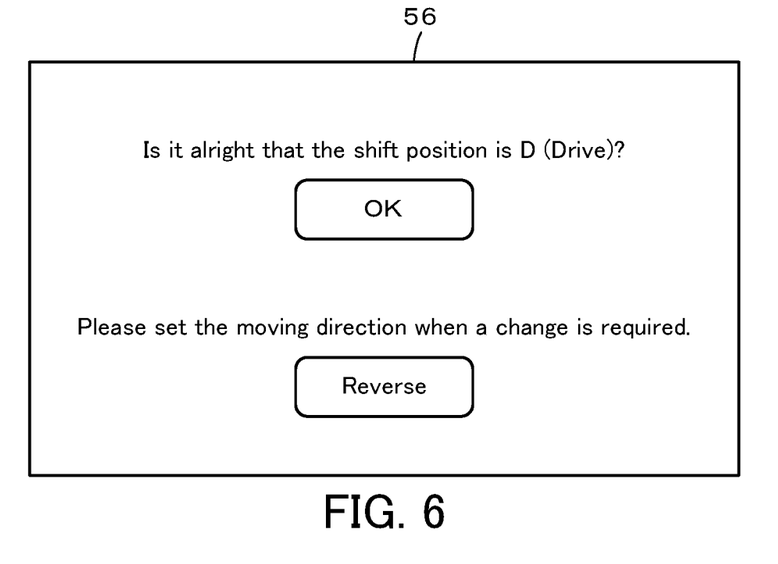
FIG. 6 is a diagram illustrating one example of contents displayed on a display of a navigation system.
Figure 7:
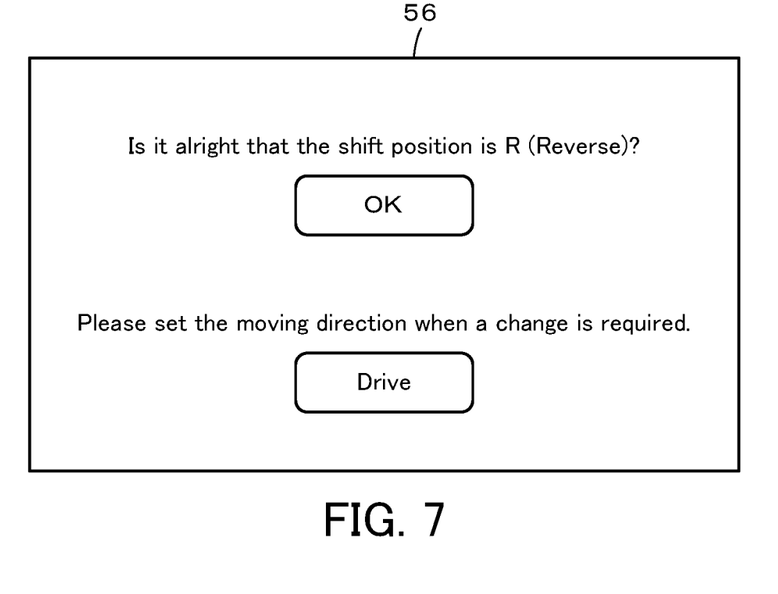
FIG. 7 is a diagram illustrating another example of the contents displayed on the display of the navigation system.

The drive ECU 38 subsequently displays an approval request of the abnormality-time shift position SP2 set at step S120 or at step S130 and a moving direction setting request when it is determined that the abnormality-time shift position SP2 is inadequate, on the display 56 of the navigation system 50 (step S140). FIG. 6 and FIG. 7 are diagrams illustrating examples of the contents displayed on the display 56 of the navigation system 50. FIG. 6 illustrates an example of the displayed contents when the abnormality-time shift position SP2 is the drive position (D position), and FIG. 7 illustrates an example of the displayed contents when the abnormality-time shift position SP2 is the reverse position (R position). A message of "Is it alright that the shift position is D (drive)?" of FIG. 6 and a message of "Is it alright that the shift position is R (reverse)?" of FIG. 7 correspond to the approval request of the abnormality-time shift position SP2. A message of "Please set a moving direction when a change is required" of FIG. 6 or FIG. 7 corresponds to the moving direction setting request when it is determined that the abnormality-time shift position SP2 is inadequate.

The drive ECU 38 subsequently determines whether an approval operation of the abnormality-time shift position SP2 is performed (step S150) and determines whether the brake pedal 47 is depressed or not (hereinafter respectively referred to as "brake ON" and "brake OFF") (step S160). When the displayed contents on the display 56 are those shown in FIG. 6 or FIG. 7, the determination of step S150 is based on determination of whether an "OK" button is touched.

When it is determined at step S150 that the approval operation of the abnormality-time shift position SP2 is performed, the drive ECU 38 terminates the display of the approval request of the abnormality-time shift position SP2 and the moving direction setting request when it is determined that the abnormality-time shift position SP2 is inadequate, on the display 56 (step S190), displays the abnormality-time shift position SP2 on the shift display unit 80 (step S200) and then terminates this routine.

When it is determined at step S150 that no approval operation of the abnormality-time shift position SP2 is performed and it is determined at step S160 to be brake OFF, the drive ECU 38 recognizes that the abnormality-time shift position SP2 is approved, irrespective of no execution of the approval operation of the abnormality-time shift position SP2. The drive ECU 38 accordingly terminates the display of the approval request of the abnormality-time shift position SP2 and the moving direction setting request when it is determined that the abnormality-time shift position SP2 is inadequate, on the display 56 (step S190), displays the abnormality-time shift position SP2 on the shift display unit 80 (step S200) and then terminates this routine.

When it is determined at step S150 that no approval operation of the abnormality-time shift position SP2 is performed and it is determined at step S160 to be brake ON, on the other hand, the drive ECU 38 subsequently determines whether a moving direction setting operation is performed (step S170). The determination of this step S170 is based on determination of whether "Reverse" is touched when the displayed contents on the display 56 are those shown in FIG. 6 and is based on determination of whether "Drive" is touched when the displayed contents on the display 56 are those shown in FIG. 7. When it is determined at step S170 that no moving direction setting operation is performed, the drive ECU 38 returns the processing to step S140.

When it is determined at step S170 that the moving direction setting operation is performed, the drive ECU 38 resets the abnormality-time shift position SP2 based on the set moving direction (step S180), terminates the display of the approval request of the abnormality-time shift position SP2 and the moving direction setting request when it is determined that the abnormality-time shift position SP2 is inadequate, on the display 56 (step S190), displays the abnormality-time shift position SP2 on the shift display unit 80 (step S200) and then terminates this routine. This process accordingly sets the user's desired (approved or set) abnormality-time shift position SP2. The user may determine that the abnormality-time shift position SP2 set at step S120 or at step S130 is inadequate, for example, when there is no dead end ahead of the vehicle but the user desires to back the vehicle for parallel parking or for back parking in a parking space.

The following describes next the abnormality-time drive control routine of FIG. 3. This routine is repeatedly performed by the drive ECU 38 when an abnormality occurs in the main ECU 70. The drive ECU 38 controls the electric power steering 29 to assist the user's steering operation, in parallel to this routine. According to this embodiment, even when an abnormality occurs in the main ECU 70, an OFF operation of an ignition switch (not shown) at stop of the vehicle causes the system off (ready off) state.

When the abnormality-time drive control routine is triggered, the drive ECU 38 uses the brake depression amount BP from the brake ECU 46 to determine whether to be brake ON or brake OFF (step S200). When it is determined to be brake OFF, the drive ECU 38 controls the motor 32 and the hydraulic brake system 40 to drive the vehicle at a predetermined vehicle speed V1 (step S210) and then terminates this routine.

The predetermined vehicle speed V1 used here is, for example, 15 km/h, 20 km/h or 25 km/h. The processing of step S210 is performed by cooperative control of the drive ECU 38 and the brake ECU 46 according to a concrete procedure described below. The procedure sets the required torque Td* such that the vehicle speed V becomes equal to the predetermined vehicle speed V1, sets the torque command Tm* of the motor 32 and the braking torque command Tbk* of the hydraulic brake system 40 based on the set required torque Td*, drives and controls the motor 32 using the torque command Tm* of the motor 32, and controls the hydraulic brake system 40 using the braking torque Tbk* of the hydraulic brake system 40. Such control enables the vehicle to be stably driven at the predetermined vehicle speed V1.

When it is determined at step S200 to be brake ON, the drive ECU 38 determines whether the vehicle is running or at stop at step (step S220). When it is determined that the vehicle is running, the drive ECU 38 controls the motor 32 and the hydraulic brake system 40 to decelerate and stop the vehicle (step S230) and then terminates this routine.

The processing of step S230 is performed by periodical cooperative control of the drive ECU 38 and the brake ECU 46 until the vehicle stops according to a concrete procedure described below. The procedure sets the required torque Td* based on the brake depression amount BP, sets the torque command Tm* of the motor 32 and the braking torque command Tbk* of the hydraulic brake system 40 based on the set required torque Td*, drives and controls the motor 32 using the torque command Tm* of the motor 32, and controls the hydraulic brake system 40 using the braking torque Tbk* of the hydraulic brake system 40. Such controls stops the vehicle, based on the brake depression amount BP. When the vehicle stops, the abnormality-time shift position setting routine of FIG. 2 is triggered.

When it is determined at step S220 that the vehicle is at stop, the driving ECU 38 controls the hydraulic brake system 40 to keep the vehicle at stop (step S240) and then terminates this routine.

Even when an abnormality occurs in the main ECU 70 (even when all the ECUs fail to recognize the shift position SP and the accelerator position Acc), this configuration controls the motor 32, the hydraulic brake system 40 and the electric power steering 29, based on the user's desired (approved or set) abnormality-time shift position SP2, the brake operation (brake depression amount BP) and the steering operation (steering angle θw), and enables the vehicle to run (by emergency drive).

As described above, when an abnormality occurs in the main ECU 70 (when all the ECUs fail to recognize the shift position SP and the accelerator position Acc), the electric vehicle 20 of the embodiment sets the abnormality-time shift position SP2, based on the location information (information with regard to the current location of the own vehicle) and the map information from the navigation system 50 and the spatial information with regard to the periphery of the vehicle from the camera 58 and the radar 59, and displays the set abnormality-time shift position SP2 on the shift display unit 80. When the user sets the moving direction, the electric vehicle 20 of the embodiment resets the abnormality-time shift position SP2, based on the set moving direction. The electric vehicle 20 of the embodiment then controls the motor 32, the hydraulic brake system 40 and the electric power steering 29, based on the abnormality-time shift position SP2, the brake operation (brake depression amount BP) and the steering operation (steering angle θw). Even in the case where the shift position SP is unrecognized, this configuration enables the vehicle to be driven with setting of the user's desired abnormality-time shift position SP2.

Moreover, when the vehicle is at stop in the state that all the ECUs fail to recognize the shift position SP, in response to setting of the abnormality-time shift position SP2 (step S120 or S130 in FIG. 2), the electric vehicle 20 of the embodiment displays the approval request of the abnormality-time shift position SP2 and the like on the display 56 of the navigation system 50 (step S140 in FIG. 2). In other words, the approval request of the abnormality-time shift position SP2 or the like is not displayed on the display 56, when the main ECU 70 recognizes the shift position SP or when the vehicle is running in the state that all the ECUs fail to recognize the shift position SP. This configuration prevents the shift position SP from competing with the abnormality-time shift position SP2 and prevents the abnormality-time shift position SP2 from being reset when the vehicle is running.

The electric vehicle 20 of the embodiment uses the map information (the road information and the like) from the navigation system 50 in the abnormality-time shift position setting routine of FIG. 2. According to a modification, the electric vehicle 20 may use map information from a vehicle exterior system that is communicable with the electric vehicle 20. The vehicle exterior system may be, for example, a cloud server or a mobile terminal (for example, a smartphone or a tablet) taken in the vehicle interior.

The electric vehicle 20 of the embodiment displays the shift position SP and the abnormality-time shift position SP2 on the shift display unit 80. According to a modification, the shift position SP and the abnormality-time shift position SP2 may be displayed, for example, on the display 56 of the navigation system 50 or on a display of a mobile terminal that is communicable with the electric vehicle 20 and that is taken in the vehicle interior or may be output from an in-vehicle speaker or a speaker of such a mobile terminal as audio output.

The electric vehicle 20 of the embodiment uses the touch panel display 56 of the navigation system 50 to allow the user to set the moving direction when the vehicle stops in the state that all the ECUs fail to recognize the shift position SP. According to a modification, the display 56 may be replaced with, for example, a touch panel display other than the display 56, a button placed in the periphery of the display 56 or the like, an in-vehicle voice recognition system, or a touch panel display, a button or a voice recognition system of a mobile terminal that is communicable with the electric vehicle 20 and that is taken in the vehicle interior.

When all the ECUs fail to recognize the shift position SP and the accelerator position Acc, in response to brake OFF, the electric vehicle 20 of the embodiment controls the motor 32 and the hydraulic brake system 40 to be driven at the predetermined vehicle speed V1. According to a modification, when all the ECUs fail to recognize the shift position SP but the main ECU 70 recognizes the accelerator position Acc, in response to brake OFF, the electric vehicle 20 may control the motor 32 and the hydraulic brake system 40 to be driven with the required torque Td* based on the accelerator position Acc. This modification enables the electric vehicle 20 to be driven based on the accelerator position Acc. All the ECUs may fail to recognize the shift position SP but the main ECU 70 may recognize the accelerator position Acc, for example, when an abnormality occurs in the shift lever 61, when an abnormality occurs in the shift position sensor 62, when an abnormality occurs in the shift ECU 60, when there is a signal abnormality between the shift positions sensor 62 and the shift ECU 60, or when there is a communication abnormality between the shift ECU 60 and the main ECU 70. When all the ECUs fail to recognize the shift position SP but the main ECU 70 recognizes the accelerator position Acc, in response to brake OFF, the main ECU 70, in place of the driving ECU 38, may perform the abnormality-time shift position setting routine of FIG. 2 and the abnormality-time drive control routine of FIG. 3.

The electric vehicle 20 of the embodiment is equipped with the drive ECU 38, the brake ECU 46, the shift ECU 60 and the main ECU 70. At least two of these ECUs may be configured as a single electronic control unit.

The embodiment describes the application of the present disclosure to the configuration of the electric vehicle equipped with the motor 32 for driving. The present disclosure may also be applied to the configuration of a hybrid vehicle that is equipped with an engine in addition to the motor 32. For example, the hybrid vehicle may be configured such that an engine and a generator are connected via a planetary gear with the driveshaft 26 coupled with the drive wheels 22a and 22b, while the motor 32 is connected with the driveshaft 26, and that the motor 32 and the generator are arranged to transmit electric power to and from the battery 36. In another example, the hybrid vehicle may be configured such that a transmission is provided between the driveshaft 26 and the motor 32 and that an engine is connected with the motor 32 via a clutch. In yet another example, the hybrid vehicle may be configured such that an engine is connected with a generator, while the motor 32 is connected with the driveshaft 26, and that the motor 32 and the generator are arranged to transmit electric power to and from the battery 36.

In the motor vehicle of this aspect, use of the moving direction setting unit may be limited when no predetermined abnormality occurs. This configuration causes the shift operation and the setting of the moving direction to be not performed when no predetermined abnormality occurs.

In the motor vehicle of another aspect, on occurrence of the predetermined abnormality, the control device may set the abnormality-time shift position, based on at least one of current location information of the vehicle, map information and peripheral spatial information as the vehicle peripheral information. Further, on occurrence of the predetermined abnormality, the control device may set a drive position to the abnormality-time shift position when there is no dead end ahead of the vehicle, while setting a reverse position to the abnormality-time shift position when there is a dead end ahead of the vehicle. This configuration enables the abnormality-time shift position to be set more appropriately when the predetermined abnormality occurs.

In the motor vehicle of another aspect, on occurrence of the predetermined abnormality, the control device may control the driving system to drive the motor vehicle at a constant vehicle speed when the user does not perform any brake operation. This configuration enables the motor vehicle to be driven stably when the predetermined abnormality occurs.

In the motor vehicle of this aspect, on occurrence of the predetermined abnormality, when the control device is enabled to recognize the accelerator operation, the control device may control the driving system, based on the accelerator operation, in addition to the abnormality-time shift position, the brake operation and the steering operation. This configuration enables the motor vehicle to be driven with reflecting the accelerator operation when the predetermined abnormality occurs.

In the motor vehicle of another aspect, the control device may include a first controller configured to recognize the shift position, the accelerator operation and the brake operation and to generate a driving command for the driving system, based on the shift position, the accelerator operation and the brake operation and a second controller configured to control the driving system, based on the driving command from the first control device. The second controller may be enabled to recognize the brake operation, and when an abnormality occurs in the first controller, the second controller may recognize occurrence of the predetermined abnormality, generate the driving command, based on the abnormality-time shift position and the brake operation, and control the driving system.

In the motor vehicle of another aspect, the control device may include a first controller configured to recognize the shift position and a second controller configured to recognize the accelerator operation and the brake operation and to control the driving system, based on the shift position received from the first controller, the accelerator operation and the brake operation. When the second controller does not receive the shift position from the first controller, the second controller may recognize occurrence of the predetermined abnormality and control the driving system, based on the abnormality-time shift position, the accelerator operation and the brake operation.

The following describes the correspondence relationship between the primary components of the embodiment and the primary components of the disclosure described in Summary. The motor 32, the inverter 34, the battery 36, the hydraulic brake system 40 and the electric power steering 29 of the embodiment correspond to the "drive system", the drive ECU 38, the brake ECU 46, the shift ECU 60 and the main ECU 70 correspond to the "control device", the shift ECU 60 and the main ECU 70 correspond to the "first controller", the drive ECU 38 and the brake ECU 46 correspond to the "second controller", the shift ECU 60 corresponds to the "first controller", the main ECU 70, the drive ECU 38 and the brake ECU 46 correspond to the "second controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the motor vehicle and so on.

The invention claimed is:

1. A motor vehicle, comprising:
a driving system configured to cause the motor vehicle to run;
a control device configured to recognize a shift position in response to a user's shift operation of a shift lever and to control the driving system, based on the shift position and the user's accelerator operation, brake operation, and steering operation, wherein
the control device is further configured to perform a routine based on the motor vehicle stopping in a state that a predetermined abnormality occurs that causes a failure in recognizing the shift position, the routine including:
the control device setting an abnormality-time shift position based on vehicle peripheral information and notifying the abnormality-time shift position, and
based on a moving direction being set by a moving direction setting unit that is provided separately from the shift lever and that allows the user to set the moving direction, the control device resetting the abnormality-time shift position based on the moving direction, and
the control device is further configured to, on occurrence of the predetermined abnormality, control the driving system based on the abnormality-time shift position, the brake operation, and the steering operation.

2. The motor vehicle according to claim 1, wherein use of the moving direction setting unit is limited when no predetermined abnormality occurs.

3. The motor vehicle according to claim 1, wherein on occurrence of the predetermined abnormality, the control device sets the abnormality-time shift position based on at least one from among current location information of the motor vehicle, map information, and peripheral spatial information as the vehicle peripheral information.

4. The motor vehicle according to claim 1, wherein on occurrence of the predetermined abnormality, the control device sets:
a drive position to the abnormality-time shift position based on there being no dead end ahead of the motor vehicle, and
a reverse position to the abnormality-time shift position based on there being a dead end ahead of the motor vehicle.

5. The motor vehicle according to claim 1, wherein on occurrence of the predetermined abnormality and while the motor vehicle is moving at a time that is different than a time when the routine is performed, the control device controls the driving system to drive the motor vehicle at a constant vehicle speed based on the user not performing any brake operation.

6. The motor vehicle according to claim 1, wherein on occurrence of the predetermined abnormality, the control device controls the driving system based on the accelerator operation, the abnormality-time shift position, the brake operation, and the steering operation.

7. The motor vehicle according to claim 1,
wherein the control device comprises:
a first controller configured to recognize the shift position, the accelerator operation, and the brake operation, and to generate a driving command for the driving system, based on the shift position, the accelerator operation, and the brake operation; and
a second controller configured to control the driving system based on the driving command from the first controller, wherein
the second controller is enabled to recognize the brake operation, and
based on an abnormality occurring in the first controller, the second controller recognizes occurrence of the predetermined abnormality, generates the driving command based on the abnormality-time shift position and the brake operation, and controls the driving system.

8. The motor vehicle according to claim 1,
wherein the control device comprises:
a first controller configured to recognize the shift position; and
a second controller configured to recognize the accelerator operation and the brake operation, receive the shift position from the first controller, and control the driving system based on the shift position received from the first controller, the accelerator operation, and the brake operation, wherein
based on the second controller not receiving the shift position from the first controller, the second controller recognizes occurrence of the predetermined abnormality and controls the driving system based on the abnormality-time shift position, the accelerator operation, and the brake operation.

9. The motor vehicle according to claim 3, wherein
on occurrence of the predetermined abnormality, the control device sets the abnormality-time shift position based on the current location information of the motor vehicle as the vehicle peripheral information.

10. The motor vehicle according to claim 3, wherein
on occurrence of the predetermined abnormality, the control device sets the abnormality-time shift position based on the map information as the vehicle peripheral information.

11. The motor vehicle according to claim 10, wherein the map information includes road information.

12. The motor vehicle according to claim 3, wherein
on occurrence of the predetermined abnormality, the control device sets the abnormality-time shift position based on the peripheral spatial information as the vehicle peripheral information.

13. The motor vehicle according to claim 12, further comprising a sensor configured to detect a periphery of the motor vehicle such as to obtain the peripheral spatial information.

14. A motor vehicle, comprising:
a driving system configured to cause the motor vehicle to run; and
a control device configured to recognize a shift position in response to a user's shift operation of a shift lever and to control the driving system, based on the shift position and the user's accelerator operation, brake operation, and steering operation, wherein
the control device is further configured to perform a routine based on the motor vehicle stopping in a state that a predetermined abnormality occurs that causes a failure in recognizing the shift position, the routine including the control device setting an abnormality-time shift position based on vehicle peripheral information and notifying the abnormality-time shift position,
wherein the vehicle peripheral information is information concerning an environment external to the motor vehicle.

15. The motor vehicle according to claim 14,
wherein on occurrence of the predetermined abnormality, the control device sets the abnormality-time shift position based on at least one from among current location information of the motor vehicle with respect to the environment external to the motor vehicle, map information of the environment external to the motor vehicle, and peripheral spatial information of the motor vehicle with respect to the environment external to the motor vehicle as the vehicle peripheral information.

16. The motor vehicle according to claim 15,
wherein on occurrence of the predetermined abnormality, the control device sets the abnormality-time shift position based on the current location information of the motor vehicle with respect to the environment external to the motor vehicle as the vehicle peripheral information.

17. The motor vehicle according to claim 15,
wherein on occurrence of the predetermined abnormality, the control device sets the abnormality-time shift position based on the map information of the environment external to the motor vehicle as the vehicle peripheral information.

18. The motor vehicle according to claim 15,
wherein on occurrence of the predetermined abnormality, the control device sets the abnormality-time shift position based on the peripheral spatial information of the motor vehicle with respect to the environment external to the motor vehicle as the vehicle peripheral information.

19. A motor vehicle, comprising:
a driving system configured to cause the motor vehicle to run; and
a control device configured to recognize a shift position in response to a user's shift operation of a shift lever and to control the driving system, based on the shift position and the user's accelerator operation, brake operation, and steering operation, wherein
on occurrence of a predetermined abnormality that causes a failure in recognizing the shift position, the control device sets an abnormality-time shift position based on vehicle peripheral information and notifies the abnormality-time shift position, and on occurrence of the predetermined abnormality, the control device sets:
a drive position to the abnormality-time shift position based on there being no dead end ahead of the motor vehicle, and
a reverse position to the abnormality-time shift position based on there being a dead end ahead of the motor vehicle.

20. The motor vehicle according to claim 19, wherein on occurrence of the predetermined abnormality:
based on a moving direction being set by a moving direction setting unit that is provided separately from the shift lever and that allows the user to set the moving direction, the control device resets the abnormality-time shift position based on the moving direction, and controls the driving system based on the abnormality-time shift position, the brake operation, and the steering operation.

* * * * *